United States Patent
Cohen et al.

(10) Patent No.: US 6,829,764 B1
(45) Date of Patent: Dec. 7, 2004

(54) SYSTEM AND METHOD FOR MAXIMIZING USAGE OF COMPUTER RESOURCES IN SCHEDULING OF APPLICATION TASKS

(75) Inventors: Mitchell Adam Cohen, Kisco, NY (US); Anant Deep Jhingran, Elmsford, NY (US); Ronald Mraz, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 08/880,616

(22) Filed: Jun. 23, 1997

(51) Int. Cl.[7] ............................................... G06F 9/00
(52) U.S. Cl. ..................................... 718/103; 718/107
(58) Field of Search ............................... 395/672, 673; 709/104, 105, 103, 102; 718/103, 107, 102, 106, 100

(56) References Cited

U.S. PATENT DOCUMENTS

| | | | | |
|---|---|---|---|---|
| 4,318,173 A | * | 3/1982 | Freedman et al. | 364/200 |
| 5,012,409 A | * | 4/1991 | Fletcher et al. | 364/200 |
| 5,185,861 A | * | 2/1993 | Valencia | 395/200 |
| 5,325,526 A | * | 6/1994 | Cameron et al. | 395/650 |
| 5,339,425 A | * | 8/1994 | Vanderah et al. | 395/700 |
| 5,379,428 A | * | 1/1995 | Belo | 395/650 |
| 5,630,128 A | * | 5/1997 | Farrell et al. | 395/673 |
| 5,659,777 A | * | 8/1997 | Iwasaki et al. | 709/226 |
| 5,692,193 A | * | 11/1997 | Jagannathan et al. | 395/676 |
| 5,701,439 A | * | 12/1997 | James et al. | 703/17 |
| 5,745,778 A | * | 4/1998 | Alfieri | 395/800.01 |
| 5,826,081 A | * | 10/1998 | Zolnowsky | 709/103 |
| 5,872,972 A | * | 2/1999 | Boland et al. | 395/672 |

FOREIGN PATENT DOCUMENTS

| | | | | |
|---|---|---|---|---|
| WO | WO 92/03794 | * | 3/1992 | 364/200 |

OTHER PUBLICATIONS

IBM TDB, "Service Management", Dec. 1973, pp. 2330–2338.*
Custer, "Inside WIndows NT", Microsoft Press, Chapter 4 pp. 83–97, Dec. 1993.*
Ripps, "The Multitasking Mindset Meets the Operating System," EDN, v35, n20, p115(9), pp. 1–13, Oct. 1990.*

* cited by examiner

*Primary Examiner*—Sue Lao
(74) *Attorney, Agent, or Firm*—Douglas W. Cameron; Anne Vachon Dougherty

(57) ABSTRACT

A task schedule is enforced among multiple processes by setting process priorities based upon which tasks are running on which processes and based upon the task schedule. The task scheduling may be provided by a local or global scheduler which uses application information to prioritize tasks. The task schedule, or priority list, is provided at Local Activity Schedulers which schedule the activities for their local execution elements/nodes. Execution of activities locally are performed by any number of processes that reside in each execution element. These processes are assigned operating system priorities by the respective Local Activity Scheduler based on their assigned activities for execution and the task schedule.

16 Claims, 5 Drawing Sheets

| ACTIVITY ID |
|---|
| A |
| B |
| C |
| D |
| ⋮ |

FIG.2

| LOCAL SCHEDULER ID | LOCAL SCHEDULER LOCATION |
|---|---|
| 0 | W |
| 1 | X |
| 2 | Y |
| 3 | Z |
| ⋮ | ⋮ |

FIG.3

| ACTIVITY ID | PROCESS ID | PRIORITY ASSIGNMENT |
|---|---|---|
| A | 27 | 1 |
| E | 28 | 2 |
| D | 29 | 3 |
| B | 30 | 4 |
| ⋮ | ⋮ | ⋮ |

FIG.4

SYSTEM AND METHOD FOR MAXIMIZING USAGE OF COMPUTER RESOURCES IN SCHEDULING OF APPLICATION TASKS

FIELD OF THE INVENTION

This invention relates to scheduling of applications among processes in one or more associated computers; and, more particularly, to a scheduling system which implements a task schedule by setting operating system priorities for the processes working on queued activities to optimize usage of shared computer resources.

BACKGROUND OF THE INVENTION

Scheduling of activities is needed when a computer is running multiple activities or applications. Assuming that each application or activity comprises more than one task, the tasks must be scheduled among available processes of the computer, often with the order of tasks being predetermined based upon the requirements of the application. For example, when doing a merge-sort operation, the tasks of sorting records into lists must be performed before the next task of merging the lists. The scheduling task becomes more challenging in a multi-processor parallel computing environment, where multiple tasks may be run simultaneously by associated processes. For optimal usage of the available resources, processes should have waiting tasks queued for commencement as soon as previous tasks have been completed, with "wait states" being filled in with queued tasks.

In the past, load control has been used for multi-process scheduling. Under a load control scheduling scheme, only a subset of the total number of tasks are allowed to run at one time. If the processes for each of the subset of tasks all enter wait states (for example, pending the completion of a parallel-running task of the application by another process), the CPU will be unused throughout the duration of the wait states, even though there is more work queued. Scheduling of too few activities under the load control mechanism, therefore, frequently leads to under-utilization of the CPU. On the other hand, if too many activities are allowed to run at once under a load control scheme, which is done under the assumption that all activities will not enter wait states at the same time, the ability to schedule among all of the tasks which are running is lost.

Another scheduling method which has been used in the prior art is priority-based scheduling for management of computer resources. Under a priority-based scheduling scheme, an operating system scheduler prioritizes the workload and schedules one task to be active at any given time. For example, on the AIX* (* Trademark of International Business Machines Corporation) operating system, if applications A, B and C are to be scheduled in alphabetical order, and processes 1, 3 and 5 are working on A, 2 and 4 on B, and 6 on C, then processes 1, 3 and 5 have their operating system priorities set to 60, 2 and 4 to 61, and 6 to 62 (where lower process priority is more favorable). The prioritization scheme is effectively a resource utilization mechanism that does not perform scheduling of prioritized tasks among processes with the intent of running one or more applications as quickly and efficiently as possible.

When an activity to be scheduled does not parallelize into even amounts of work, neither load nor uniprocessor priority scheduling can maximize the application throughput. Database management systems, wherein the amount of work necessary for any task cannot be quantified in advance without detailed knowledge of the database and of the transactions to be performed thereon, defy scheduling by load or uniprocessor prioritization. Ideally, the scheduler must provide the ability to continue on to other activities related to the initial task when part of a parallel activity has been completed yet other related parts have not been completed.

What is desirable, therefore, is a dynamic priority scheduling mechanism for scheduling activities with multiple tasks among multiple processes, for minimizing unused CPU time.

It is therefore an objective of the present invention to implement scheduling at the task level.

It is additionally an objective of the present invention to provide multiple task scheduling which will minimize unused CPU time.

Still another objective of the invention is to provide coordination of activities among parallel computational resources to minimize unused CPU and optimize application run-time.

SUMMARY OF THE INVENTION

These and other objectives are realized by the present invention wherein a task schedule is enforced among multiple processes by setting process priorities based upon which tasks are running on which processes and based upon the task schedule. The task scheduling may be provided by a local or global scheduler which uses application information to prioritize tasks. The task schedule, or priority list, is provided at Local Activity Schedulers which schedule the activities for their local execution elements/nodes. Execution of activities locally are performed by any number of processes that reside in each execution element. These processes are assigned operating system priorities by the respective Local Activity Scheduler based on their assigned activities for execution and the task schedule.

BRIEF DESCRIPTION OF THE DRAWINGS

The invention will now be described in detail with specific reference to the attached drawings wherein:

FIG. 2 illustrates the Activity Priority list maintained in accordance with the present invention.

FIG. 3 illustrates the Local Activity Scheduler list maintained by the Global Activity Scheduler of the present invention.

FIG. 4 illustrates the Activity-Process Correspondence Table maintained in accordance with the present invention.

DESCRIPTION OF THE PREFERRED EMBODIMENT

Figure 1:
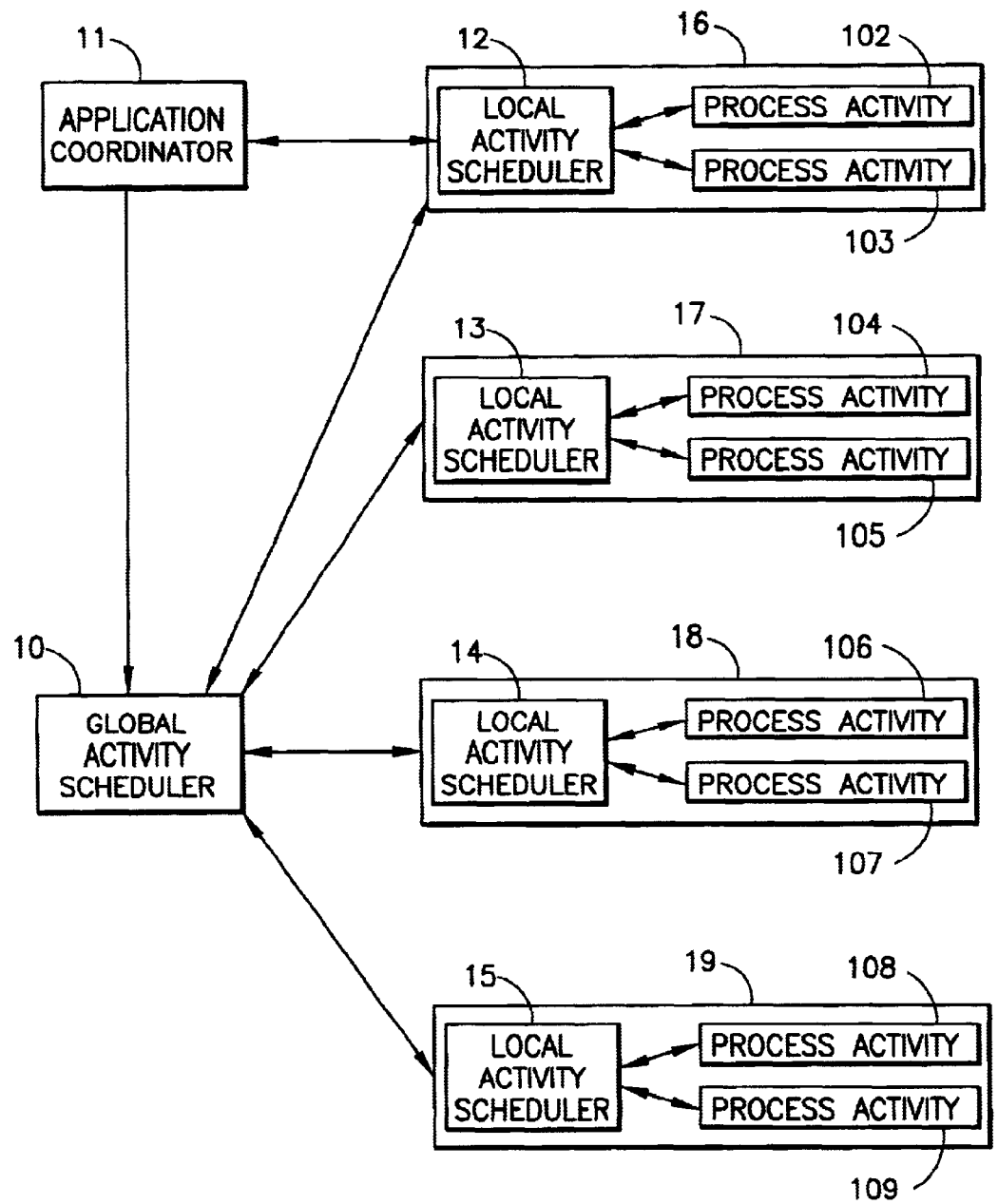
FIG. 1 provides a schematic illustration of a parallel processing system utilizing one embodiment of the present invention.

One embodiment of the inventive multiple activity scheduling system for a parallel processing environment is illustrated in FIG. 1. As shown therein, a Global Activity Scheduler 10, utilizing information received from the applications as provided via the Application Coordinator 11, provides a prioritized schedule of tasks or activities along communication links to nodes 16–19. Each node is provided with a Local Activity Scheduler 12–15 which schedules each of the its associated processes, 102–109. The schedule information may be regularly updated based upon incoming activities to be scheduled and based upon information provided by continual monitoring of the resources at the nodes. As illustrated, communications between the entities are bi-directional, with the Local Activity Schedulers continuously reporting process information to the Global Activity Scheduler directly or via updates through the Application Coordinator, as will be further detailed below. While the system has been illustrated to include four nodes, each having two processes, it will be apparent that the present invention can be applied to a system having any number of nodes in communication with a Global Activity Scheduler, wherein each node may have any number of associated processes. Each node in the system is necessarily provided with a dedicated Local Activity Scheduler, which may or may not be physically located at the node. If the Local Activity Scheduler which is associated with a particular node is not physically located at that node, it is understood that the Local Activity Scheduler would be in constant communication with the operating system at the node. The Local Activity Scheduler is responsible for establishing the operating system priorities for implementing the task schedule at the node. In an alternative embodiment, the Local Activity Scheduler may itself stablish the task schedule, if no global entity is available or required, as further detailed below.

In the illustrated embodiment, for each activity to be scheduled, an activity ID is created. The activity ID can be the application command string, the user ID running the command, or an ID created by the application or by some other process at the Application Coordinator or Global Activity Scheduler. In addition, each process in a node has a process ID. When a process begins or ends its work on a task, it reports its activity ID and process ID to the Local Activity Scheduler process, which in turn reports the activity ID directly to the Global Activity Scheduler in a Begin-End Task message or indirectly via future updates from the Application Coordinator. The Global Activity Scheduler is provided with knowledge of which applications are in the system. Then the Global Activity Scheduler creates a schedule based on a scheduling algorithm (or uses a predetermined schedule) for the application tasks and forwards this schedule to each Local Activity Scheduler associated with each node of the parallel computer.

The Local Activity Schedulers are each responsible for tracking which processes are working on which applications at their node. Using this knowledge and the task schedule (hereinafter referred to as the Activity Priority list), each Local Activity Scheduler determines the priorities for each of the processes on its node, and directs the local operating system to set the process priorities for optimal execution of the prioritized activities.

All of the processes working on tasks for the same will get the same priority, with each activity being assigned a unique priority. When no more unique priorities exist, the activities scheduled at the end can all be given the least favored priority. When all the processes in the highest prioritized activities are not using CPU, the operating system will have the activity with the second highest priority use the CPU, and so on, to thereby limit the amount of unused CPU time.

For the FIG. 1 embodiment, FIGS. 2 and 3 provide representative examples of two internal structures which would be dynamically maintained at the Global Activity Scheduler, specifically the Activity Priority list and the Local Activity Scheduler list. The Local Activity Scheduler list of FIG. 3 comprises a list of all active Local Activity Schedulers in the system which are under the control of the Global Activity Scheduler (for example, at all nodes of a partition). As shown in FIG. 3, the list includes the Local Scheduler ID along with its location address. The Local Activity Scheduler list is maintained for utilization when broadcasting priority information and is continually updated by communications received from the Local Activity Schedulers.

The Activity Priority list of FIG. 2 is the task schedule which is derived from communication with the applications (from the Application Coordinator in the FIG. 1 implementation), as to which activities are active in the system. The Activity Priority list provides the activity IDs in priority order. Reception of Begin and End application messages from the Application Coordinator allows the scheduling program at the Global Activity Scheduler, or at the Local Activity Scheduler in the alternative embodiment, to maintain the Activity Priority list. The priorities of activities on the list can be determined by utilizing any number of parameters related to the activities to be scheduled. Examples of relevant parameters include the relative importance of the user activities (as provided by the user or a programmer), time deadlines, user expense guidelines, resource requirements, etc. Any message reception from the Application Coordinator triggers the relevant scheduling program out of its wait state to generate an updated Activity Priority list. In addition, completion of an activity, as communicated from the processes at a node, will cause removal of the activity from the Activity Priority list, and updating of the schedule. In the FIG. 1 embodiment, the Global Activity Scheduler broadcasts the Activity Priority list to all Local Activity Schedulers either immediately upon generation of a new list or at periodic intervals.

At the Local Activity Scheduler, the latest version of the Activity Priority list is maintained, as communicated from the Global Activity Scheduler in the FIG. 1 embodiment, or as derived locally in the alternative embodiment. In addition, the Local Activity Scheduler maintains an Activity-Process Correspondence table, as shown in FIG. 4. The Activity-Process Correspondence table reflects the assignment of activities at the node to the node's processes, along with the respective priorities of the activities. This information may be obtained directly from the processes themselves, under a task registration protocol, or indirectly, for example from the database monitor of a database on which processes are performing tasks. In the FIG. 4 illustration, assuming a node having five available processes, the Activity IDs are paired with process IDs, with the respective activity priority assignments listed with the activity-process pairings. The priority assignments found on the Activity-Process Correspondence table are assigned by the Local Activity Scheduler based upon the Activity Priority list.

Figure 5:
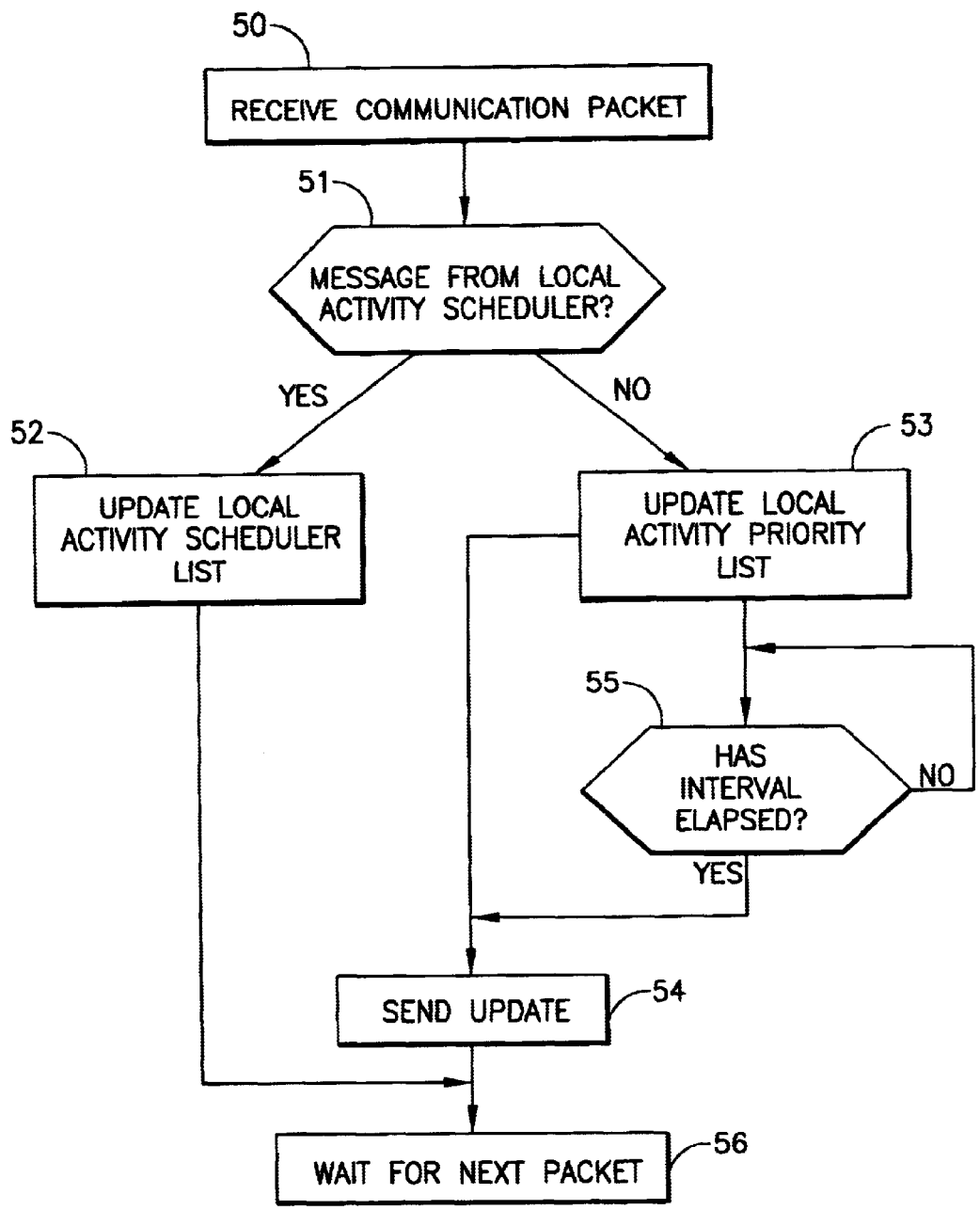
FIG. 5 provides a flow chart representative of the operations of the Global Activity Scheduler of the present invention.

FIG. 5 provides a representative process flow of the operations performed by the Global Activity Scheduler of the FIG. 1 embodiment. At box 50, a communication packet is received at the Global Activity Scheduler, and, in step 51, the packet is analyzed to determine if the message is from the Local Activity Scheduler or if from the Application Coordinator. If the message comprises a communication regarding processes from the Local Activity Scheduler, the Activity Scheduler list is updated to reflect the available processes, at step 52. If the message is from the Application Coordinator regarding completed tasks or tasks to be commenced, the scheduling program in invoked and the Activity Priority list updated at step 53. Depending upon the preferred programming order of operations, the Global Activity Scheduler may automatically send the updated Activity Priority list to all Local Activity Schedulers, as shown at step 54, or may wait until a pre-set time interval has elapsed, as indicated by decision box 55, and then send the list. The Global Activity Scheduler then waits for the next communication packet, as shown at step 56.

Figure 6:
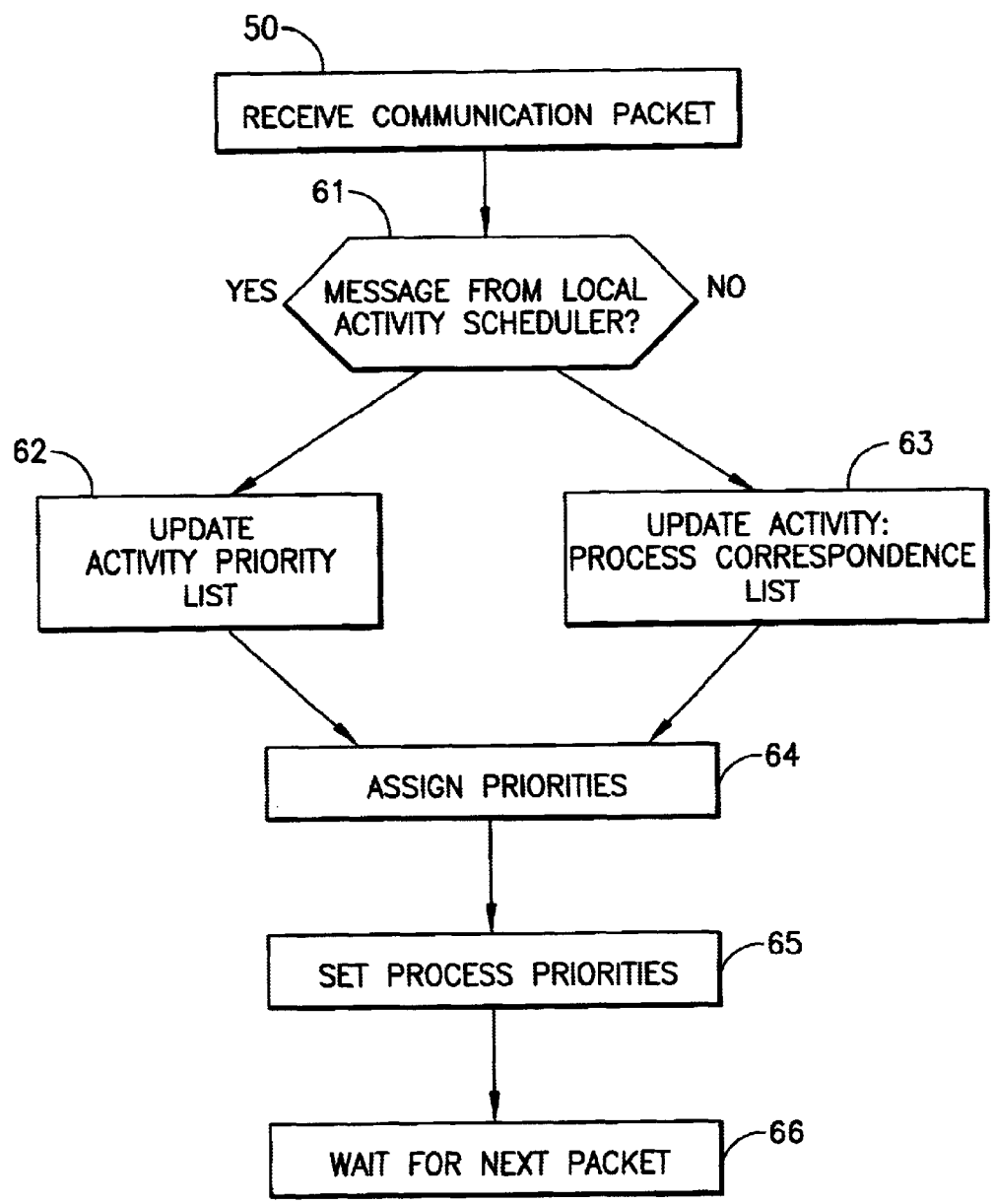
FIG. 6 provides a flow chart representative of the operations of the Local Activity Schedulers of the present invention.

FIG. 6 illustrates the representative process flow of operations conducted by the Local Activity Scheduler of the FIG. 1 embodiment. Upon receipt of a communication packet at 60, the Local Activity Scheduler determines, as indicated by decision box 61, whether the communication is from the Global Activity Scheduler or from one of its activity processes. If the message is from the Global Activity Scheduler, the message will contain an Activity Priority list to replace the previously-communicated list, as reflected at step 62. As noted above, the Local Activity Scheduler could, in an alternative embodiment, be the entity that establishes the task schedule, and would therefore automatically update its Activity Priority list. If the message is from an activity process, presumably either a Begin or End task message, then the Local Activity Scheduler updates the Activity-Process Correspondence table at step 63. In addition, at this juncture, the Local Activity Scheduler may communicate task-related messages (not shown) to the Global Activity Scheduler. Since communications between nodes and the applications/Application Coordinator regarding task commencement and completion are well known and need not be altered to implement the present invention, and since the Application Coordinator necessarily relays such information to the Global Activity Scheduler, it is not strictly necessary to incorporate the redundant step of the Local Activity Scheduler communicating task commencement and completion messages to the Global Activity Scheduler.

Simultaneous with, or subsequent to, the appropriate updating of the Activity-Process Correspondence table, the Local Activity Scheduler assigns priorities, at step 64, and directs the local operating system to set the process priorities for execution of tasks at the node, at step 65. Finally, the Local Activity Scheduler enters a waiting state at step 66, awaiting receipt of the next communication packet.

Figure 7:
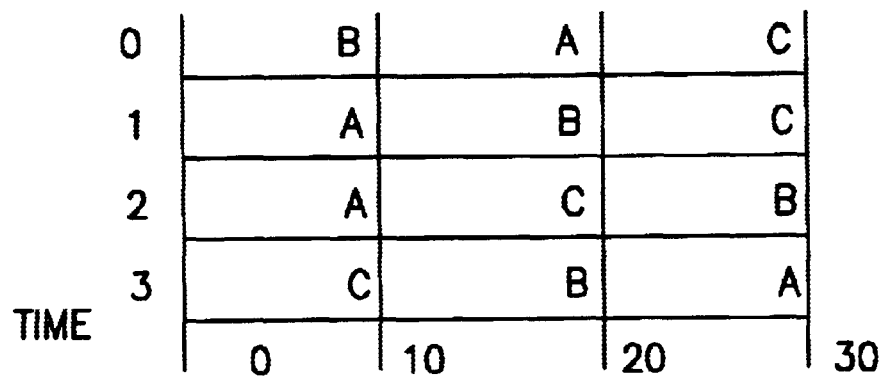
FIG. 7 provides a Gantt Chart of prior art scheduling of 4-way parallel activities.
Figure 8:
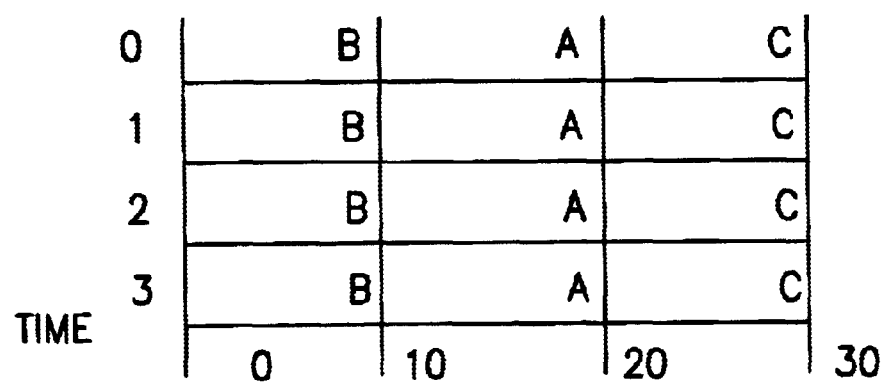
FIG. 8 provides a Gantt Chart of scheduling of 4-way parallel activities in accordance with the present invention.

By dynamically assigning priorities and allowing the local processes to move from one task to the next highest priority task without waiting, the system maximizes utilization of the CPU resources at each node. FIG. 7 shows a Gantt Chart of Random scheduling of three 4-way parallel activities. In the prior art example, three parallel activities (A, B and C) are distributed across four processes or machines and are active at time zero. When each of the respective parallel parts are complete, the activity associated with the task is complete. The Random chart shows that each of the tasks is complete at time 30, and that the average time for completion is 30. This is because at least on parallel part of each activity was not able to begin until time 20. On the other hand, when using the inventive system, as illustrated on the Gantt chart of FIG. 8, the average time to complete an activity would be 20, resulting in a speed-up of 33.3%, due to the parallel scheduling of activities among the processes.

It is to be noted that in a parallel environment wherein the queued activities to be scheduled are similar in size and arrival time and are performing similar tasks, in terms of resource requirements, such as periodic display of fixed amounts of data retrieved from an outside source or database operations wherein the database is divided equally among the available processes, the activities of the Global Activity Scheduler could be performed by the Local Activity Schedulers, which would generate virtually identical schedules, thereby obviating the need for coordination of those schedules at the "global" level.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. Apparatus in a UNIX-based environment for providing scheduling at one time of a plurality of tasks of more than one application among processes in more than one computing node, each node having a plurality of local processes, comprising:

global scheduler means comprising scheduling means for dynamically creating a global prioritized schedule of said plurality of tasks of said more than one application to allow execution of different tasks of more than one application at the same time at the computing nodes and for dynamically updating said global prioritized schedule based on application information and local process information received from said more than one computing node, and communication means for communicating said global prioritized schedule to said more than one computing node; and at least one local scheduler associated with each of said more than one computing node comprising means for receiving said global prioritized schedule, means for ascertaining which of said plurality of tasks are assigned tasks, being assigned to each of said plurality of local processes, means for prioritizing said assigned processes, and means to update a local priority list to include said assigned processes based on said global prioritized schedule to allow simultaneous execution of tasks from said more than one application and means for communicating a local process information to said global scheduler means.

2. The apparatus of claim 1 wherein each of said more than one computing node additionally comprises at least one operating system for receiving input from said means for prioritizing and for directing said assigned processes to execute said tasks in accordance with said prioritizing.

3. The apparatus of claim 2 wherein said operating system is further adapted to interleave the execution of local tasks with said tasks.

4. The apparatus of claim 2 further comprising application coordinator means for communicating application information about said plurality of tasks to said global scheduler means for use in dynamically creating and updating said schedule.

5. The apparatus of claim 2 wherein said local processes are adapted to perform tasks in parallel.

6. The apparatus of claim 1 wherein said global scheduler means further comprises timer means associated with said communication means to periodically effect communication of said dynamically created prioritized schedule to said local schedulers.

7. The apparatus of claim 1 wherein said global scheduler means includes at least one table comprising the identity and address for each of said at least one local scheduler.

8. A method in a UNIX-based computing environment for scheduling a plurality of tasks of more than one application among processes on more than one computing node, in a system having a global scheduler means and more than at least one computing node, each computing node having a local scheduler associated therewith and a plurality of local processes comprising the steps of:

providing application information and local process information to said global scheduler means;

dynamically creating a global prioritized schedule of said plurality of tasks, said schedule including tasks of said more than one application, based on said application information and said local process information;

communicating said global prioritized schedule to said more than one computing node;

determining correspondence between said plurality of tasks and said plurality of local processes; and dynamically prioritizing said local processes based on said global prioritized schedule to allow simultaneous execution of tasks from said more than one application.

9. The method of claim 8 wherein said, dynamically prioritizing comprises invoking operating system priorities to schedule tasks in accordance with said prioritized schedule.

10. The method of claim 8 wherein said global scheduler means is remotely located from said more than one computing node, further comprising the steps of communicating said global prioritized schedule of tasks to said more than one computing node.

11. The method of claim 9 further comprising the step of said local processes executing said tasks in parallel in accordance with said dynamic prioritizing.

12. The method of claim 11 further comprising the steps of repeating said steps of dynamically creating a prioritized schedule of said plurality of tasks; determining correspondence between said plurality of tasks and said plurality of local processes; and dynamically prioritizing said local processes in accordance with said prioritized schedule; executing; and communicating information about execution until all tasks have been completed.

13. The method of claim 11 further comprising the step of interleaving execution of local tasks with said executing of said tasks of more than one application.

14. The method of claim 10 further comprising said remotely located scheduler dynamically maintaining at least one list of said at least more than one computing node.

15. The apparatus of claim 1 wherein said global scheduler means is adapted to automatically update said local priority list.

16. The method of claim 8 wherein said dynamically creating a global prioritized schedule of said plurality of tasks comprises the steps of:

receiving task information from at least one of an application coordinator and the more than one computing node;

maintaining an activity scheduler list relating to available processes at said computing nodes and an activity priority list based on said task information.

* * * * *